United States Patent [19]

Naganawa et al.

[11] Patent Number: 5,738,813
[45] Date of Patent: Apr. 14, 1998

[54] RELEASE AGENT COMPOSITION FOR TIRE MOLDING

[75] Inventors: Tsutomu Naganawa; Isao Ona, both of Chiba Prefecture, Japan

[73] Assignee: Dow Corning Toray Silicone Co., LTD., Tokyo, Japan

[21] Appl. No.: 504,346

[22] Filed: Jul. 19, 1995

[30] Foreign Application Priority Data

Jul. 26, 1994 [JP] Japan ................................ 6-193690

[51] Int. Cl.$^6$ ........................... B28B 7/36; B28B 7/38
[52] U.S. Cl. ............. 264/130; 106/38.22; 264/315; 264/326; 508/143; 508/148
[58] Field of Search ........................... 264/130, 326, 264/315, 300; 106/38.22; 508/148, 143, 144

[56] References Cited

U.S. PATENT DOCUMENTS

| | | | |
|---|---|---|---|
| 3,713,851 | 1/1973 | Cekada, Jr. | 106/38.22 |
| 3,872,038 | 3/1975 | Adams et al. | 106/38.22 |
| 4,184,880 | 1/1980 | Huber et al. | 106/38.22 |
| 4,431,452 | 2/1984 | Comper et al. | 106/38.22 |
| 4,509,984 | 4/1985 | Scheiderich et al. | 106/38.22 |
| 4,840,742 | 6/1989 | Hoffman | 106/38.22 |

OTHER PUBLICATIONS

JIS Z-8801, Japanese Industrial Standard, 1994, pp. 1-13, cited for informational purpose only.

*Primary Examiner*—Mathieu D. Vargot
*Attorney, Agent, or Firm*—James L. Decesare

[57] ABSTRACT

A release agent composition for tire molding applications that, when applied on the inner liner surface of an unvulcanized green tire, has a white color prior to vulcanization and a black to blackish-gray color after vulcanization. The release agent composition contains a diorganopolysiloxane that has a viscosity at 25° C. of at least 100 centistokes, an emulsifying dispersant, mica powder or talc powder, a powder having a melting point not exceeding 200° C., and water.

3 Claims, No Drawings

RELEASE AGENT COMPOSITION FOR TIRE MOLDING

BACKGROUND OF THE INVENTION

This invention relates to a release agent composition for use in tire molding or a tire molding release agent composition. More particularly, this invention relates to a tire molding release agent composition that, when applied to the surface of the inner liner of the unvulcanized green tire, has a white color prior to vulcanization and appears black to blackish-gray after vulcanization.

Unvulcanized green tires are molded in the vulcanizing process by the hot water or steam inflation of a bag known as a bladder placed within the green tire in order to press the unvulcanized green tire into the mold and thereby mold same. The use of a mica powder-containing release agent or a talc powder-containing release agent in tire molding has been essential (i) due to the requirement during inflation for good lubrication between the bladder and the inner liner surface (inside surface) of the green tire, (ii) in order to facilitate release between the bladder and the inner liner surface of the vulcanized tire during post-vulcanization bladder retraction, and (iii) in order to facilitate elimination of air (air bleed) that has infiltrated into the gap between the bladder and inner liner surface. The older tire molding release agents were mixtures of silicone oil and mica powder or talc powder in rubber volatile oil or gasoline with the main component being the rubber volatile oil or gasoline. These tire molding release agents were applied to the inner liner surface by spraying and the large amount of rubber volatile oil or gasoline solvent was then evaporated. The tire was thereafter fabricated by vulcanization of the green tire in the vulcanizer. Large amounts of petroleum-based solvent were used, and resulted in problems such as solvent explosions, fire risks, atmospheric pollution due to dissemination of the solvent into the air, solvent intoxication of workers due to the use of solvent, and resource loss. Tire molding release agents that use water in place of petroleum-based solvents have been proposed in order to solve these problems in Japanese Patent Publication Number Sho 53-21701 [21,701/1978] and Japanese Patent Application Laid Open Kokai or Unexamined Numbers Sho 50-86490 [86,490/1975], Sho 51-88579 [88,579/1976], Sho 48-13448 [13,448/1973], and Sho 52-86477 [86,477/1977].

However, these tire molding release agents still suffer from several drawbacks. Thus, after vulcanization, the mica powder or talc powder component is both press-bonded into the bladder and remains on the surface of the inner liner of the molded tire. This causes the inner liner surface to have a blotchy white appearance that impairs the commercial value. In addition, the mica powder or talc powder stuck to the bladder surface after the completion of tire vulcanization falls onto the mold and ends up stuck on the surface of the tire that is molded in the next cycle. Black release agents for tire molding service have been used to some extent in order to address these drawbacks. These black release agents are prepared by the addition of small quantities of carbon black to conventional tire molding release agents. Unfortunately, the black color of these tire molding release agents makes it impossible to obtain uniform, blotch-free application in the prescribed quantity prior to vulcanization. As a result, a demand exists for a release agent for tire molding applications that appears white prior to vulcanization and appears black or gray after vulcanization.

SUMMARY OF THE INVENTION

The object of our invention is to solve those problems by reducing the addition of mica powder or talc powder and adding a corresponding amount of a powder with a melting point not exceeding 200° C.

Thus, our invention takes as its object the introduction of a release agent composition for tire molding applications that, when applied on the inner liner surface of the unvulcanized green tire, has a white color prior to vulcanization and a black to blackish-gray color after vulcanization.

DETAILED DESCRIPTION OF THE INVENTION

The invention relates to a release agent composition for tire molding comprising:

(A) 3.0 to 20.0 weight % diorganopolysiloxane that has a viscosity at 25° C. of at least 100 centistokes, (B) 0.5 to 20.0 weight % of an emulsifying dispersant, (C) 3.0 to 25.0 weight % mica powder or talc powder, (D) 3.0 to 33.0 weight % of a powder having a melting point not exceeding 200° C., and (E) 90.5 to 2.0 weight % water.

Diorganopolysiloxane component (A) functions as a release agent and lubricant during tire molding. Its viscosity at 25° C. must be at least 100 centistokes and preferably is in the range of 300 to 100,000 centistokes. The diorganopolysiloxane is exemplified by dialkylpolysiloxanes such as dimethylpolysiloxane, diethylpolysiloxane, methylisopropylpolysiloxane, and methyldodecylpolysiloxane; alkylphenylpolysiloxanes such as methylphenylpolysiloxane, dimethylsiloxane-methylphenylsiloxane copolymers, and dimethylsiloxane-diphenylsiloxane copolymers; alkylaralkylpolysiloxanes such as methyl(phenylethyl)polysiloxane and methyl(phenylpropyl)polysiloxane; and 3,3,3-trifluoropropylmethylpolysiloxane. The ends of the diorganopolysiloxane chain are endblocked by a hydroxyl group or a triorganosilyl group such as trimethylsilyl, dimethylvinylsilyl, methylvinylphenylsilyl, and dimethylphenylsilyl. The diorganopolysiloxane should be straight chain, but it can be partially branched. It should make up 3.0 to 20.0 weight % of the composition. Its presence in excess of 20 weight % impairs air bleed during tire molding and raises the cost, while a good release performance and lubrication performance are not obtained when it is present at less than 3.0 weight %.

The emulsifying dispersant component (B) functions to emulsify and disperse diorganopolysiloxane (A) in water (E) and also to homogeneously disperse and stabilize components (C) and (D). Any emulsifying dispersant may be used such as nonionic and anionic surfactants; natural lecithin; and emulsifying dispersion assistants such as polyvinyl alcohol, methylcellulose, carboxymethylcellulose, and carboxyethylcellulose.

Nonionic surfactants are exemplified by polyalkylene glycol esters of higher fatty acids, the polyalkylene glycol ethers of higher alcohols, polyalkylene glycol ethers of polyhydric alcohols, and polyalkylene glycol ethers of alkylphenols. Lauric acid, myristic acid, palmitic acid, and stearic acid are examples of higher fatty acids used in the polyalkylene glycol esters of higher fatty acids, while octyl alcohol, lauryl alcohol, cetyl alcohol, and oleyl alcohol are examples of higher alcohols used in the polyalkylene glycol ethers of higher alcohols. The polyhydric alcohols used in the polyalkylene glycol ethers of polyhydric alcohols are exemplified by ethylene glycol, propylene glycol, glycerol, sorbitol, and sorbitan. Octylphenol, dodecylphenol, and nonylphenol are examples of alkylphenols used in the polyalkylene glycol ethers of alkylphenols. Polyalkylene glycols used in the esters and ethers are exemplified by polyethylene glycols and polyethylene glycol-polypropylene glycol copolymers. They should have a degree of polymerization (DP) of at least 1, and DPs of 5 to 30 are optimal.

Anionic surfactants are exemplified by alkylbenzenesulfonate salts and salts of the sulfate esters of higher alcohols. The alkylbenzenesulfonate salts are exemplified by sodium salts of octylbenzenesulfonic acid, dodecylbenzenesulfonic acid, and nonylbenzenesulfonic acid. The salts of the sulfate esters of higher alcohols are exemplified by sodium and potassium salts of the sulfate ester of octyl alcohol, sodium and potassium salts of the sulfate ester of lauryl alcohol, sodium and potassium salts of the sulfate ester of cetyl alcohol, and sodium and potassium salts of the sulfate ester of oleyl alcohol.

Lecithin is a naturally occurring emulsifying dispersant present in egg yolks and soybeans. Lecithin isolated from soybeans is preferred.

Polyvinyl alcohol, methylcellulose, carboxymethylcellulose, and carboxyethylcellulose are synthetic sizing agents. Not only do they function as emulsifying dispersion assistants, but they also act as sedimentation inhibitors for the mica powder and talc powder, thickeners, and emulsion stabilizers.

Better results can be obtained by using combinations of 2 to 5 kinds of emulsifying dispersants. Some are also useful as component (A). In particular, the ethers formed from polyhydric alcohols and polyethylene glycol and the ethers formed from polyhydric alcohols and polyethylene glycol-polypropylene glycol copolymers also function as lubricants. Component (B) should constitute 0.5 to 20.0 weight % of the composition.

The mica powder and talc powder of component (C) function as lubricants while also supporting the escape of air from between the bladder and inner liner surface of the green tire during tire molding. The mica and talc powders preferably have a particle size able to pass a 30 to 500 mesh sieve as specified in Japanese Industrial Standard (JIS) Z8801-1966. At 500 mesh, the very fine particles make grinding and sieve classification expensive. At below 30 mesh, the spray nozzle becomes prone to clogging due to the large size of the particles. The tire molding release agent will ordinarily be sprayed onto the inner liner surface of the tire using an automatic sprayer. The mica and talc powders are generally white to silvery grayish-white. This component should constitute 3.0 to 25.0 weight % of the composition.

The powder component (D) should have a melting point of no more than 200° C. since it is necessary that it melt at the temperatures used during tire vulcanization which is 150° C. to 200° C. This powder preferably has a particle size at 25° C. able to pass a 30 to 500 mesh sieve as specified in JIS Z8801-1966. The fact that this component is a powder at 25° C. means that it will randomly reflect light and will appear white. It should be stable in water, i.e., nonswelling and insoluble. It may be any powder that melts at the temperatures and pressures used during tire vulcanization and that solidifies into a hard state when cooled after completion of molding. Examples are carnauba wax (melting point 90° C.), waxes with a melting point of 65° C., synthetic wax (melting point 79° C.), paraffin wax (melting point 78° C.), the metal salts of higher fatty acids, high-DP polyethylene glycols (melting point 65° C.) after grinding. Metal salts of higher fatty acids are exemplified by magnesium stearate (melting point 120° C.), calcium stearate (melting point 150° C.), zinc stearate (melting point 120° C.), and aluminum stearate (melting point 161° C.). This component makes up 3.0 to 33.0 weight % of the composition.

Component (E) is water, and this component dissolves and disperses components (A) to (D). This component should constitute 90.5 to 2.0 weight % of the composition. However, at 2.0 weight %, the composition becomes powdery and difficult to spray using a sprayer. As a result, dilution by the further addition of water may be carried out as necessary.

The composition comprises components (A) to (E), but it may also contain rust preventives such as sodium sulfite, amine salts, and phosphate salts, and preservatives such as sodium benzoate, sorbic acid, and sodium sorbate.

With regard to the preparation of the composition, it is preferred that an emulsion be preliminarily prepared by emulsifying components (A) and (B) using an emulsifying device such as a colloid mill, homogenizer, or homomixer, and that components (C), (D), and (E) then be added to this emulsion.

Because the composition comprises components (A) to (E) and in particular because it contains component (D), the composition is able to render inconspicuous the whiteness originating with component (C). Even the inner liner surface is black in tires fabricated using the composition, which endows them with extremely high commercial value.

The invention is shown in more detail in the following examples, in which the viscosity is the value measured at 25° C. and "parts" denotes "weight parts".

EXAMPLE 1

Three parts of the sodium salt of polyoxyethylene (5 moles) lauryl sulfate, 2 parts polyoxyethylene (9.5 moles) nonylphenol ether, and 55 parts water were added to 40 parts trimethylsilyl-endblocked dimethylpolysiloxane (viscosity 350 centistokes), and an emulsion was prepared by emulsification using a colloid mill. To 20 parts of the resulting emulsion were added 10 parts ethylene oxide-propylene oxide adduct of glycerol (brand name Newpol G-P3000, from Sanyo Chemical Industries, Limited) and 0.2 part carboxymethylcellulose (brand name CMC-7HF from Hercules Inc.) with dissolution and dispersion to homogeneity. This was followed by the addition of 10 parts talc powder (100 mesh, white), 20 parts magnesium stearate (white, melting point 120° C., 200 mesh), and 50.8 parts water. Dissolution and dispersion to homogeneity using a four-blade stirrer gave a release agent composition for tire molding. This tire molding release agent composition was held for 7 days at room temperature, after which emulsion stability was evaluated. The results are in Table 1. The tire molding release agent composition was also sprayed onto the surface of a sheet of unvulcanized butyl rubber (25 cm×25 cm×0.22 cm thick) using a spray gun, at which time its sprayability was evaluated as shown in Table 1. After the sprayed sheet had dried at room temperature, it was overlaid with another butyl rubber sheet of the same size that had not been sprayed with the tire molding release agent composition. This assembly was placed in a 25 cm×25 cm×0.4 cm form, installed in a press, and pressed for 15 minutes at 180° C./30 kg/cm². The release performance after pressing was evaluated by peeling the 2 sheets. The appearance and smoothness of the surface of the butyl rubber sheet that had received the tire molding release agent composition was inspected visually and tactilely before and after vulcanization. These results are in Table 1 along with a global evaluation of the tire molding release agent composition.

COMPARATIVE EXAMPLE 1

A tire molding release agent composition was prepared as in Example 1, but omitting the 200 mesh magnesium stearate and increasing addition of 100 mesh talc powder to 30 parts. The emulsion stability of the tire molding release agent composition was evaluated after 7 days as in Example 1. The tire molding release agent composition was applied to a butyl rubber sheet as in Example 1, and the sprayability during application, releasability of the coated sheet, appearance and smoothness of the surface before and after vulcanization, were all evaluated as in Example 1. These results are in Table 1 along with a global evaluation of the tire molding release agent composition.

TABLE 1

|  | Example 1 | Comparative Example 1 |
|---|---|---|
| emulsion stability | stable, no separation | stable, no separation |
| sprayability | excellent | excellent |
| releasability of the coated sheet | the 2 sheets were easily peeled from each other | the 2 sheets were easily peeled from each other |
| surface of the coated sheet |  |  |
| pre-vulcanization | white, unevenness in the spray could easily be distinguished | white, unevenness in the spray could easily be distinguished |
| post-vulcanization | almost completely black with excellent smoothness | white with excellent smoothness |
| global evaluation of suitability as a release agent composition for tire molding service | very suitable | unsuitable |

EXAMPLE 2

Three parts of the sodium salt of polyoxyethylene (5 moles) lauryl sulfate, 2 parts polyoxyethylene (9.5 moles) nonylphenol ether, and 55 parts water were added to 40 parts trimethylsilyl-endblocked dimethylpolysiloxane (viscosity 350 centistokes), and an emulsion was prepared from this mixture by emulsification using a colloid mill. To 20 parts of the resulting emulsion were added 10 parts ethylene oxide-propylene oxide adduct of glycerol (brand name Newpol G-P3000 from Sanyo Chemical Industries, Limited) and 0.2 part carboxymethylcellulose (brand name CMC-7HF from Hercules Inc.) with dissolution and dispersion to homogeneity. This was followed by the addition of 10 parts talc powder (100 mesh, white), 20 parts 50 mesh polyethylene glycol (white, melting point 62° C., average molecular weight 5,000), and 50.8 parts water. Dissolution and dispersion to homogeneity using a four-blade stirrer gave a release agent composition for tire molding service. This tire molding release agent composition was held for 7 days at room temperature, after which its emulsion stability was evaluated. The results are in Table 2. The tire molding release agent composition was also sprayed onto the surface of a sheet of unvulcanized butyl rubber (25 cm×25 cm×0.22 cm thick) using a spray gun, at which time its sprayability was evaluated as shown in Table 2. After the sprayed sheet had dried at room temperature, it was overlaid with another butyl rubber sheet of the same size that had not been sprayed with the tire molding release agent composition. This assembly was placed in a 25 cm×25 cm×0.4 cm form, installed in a press, and pressed for 15 minutes a 180° C./30 kg/cm². The release performance after pressing was evaluated by peeling the 2 sheets. The appearance and smoothness of the surface of the butyl rubber sheet that had received the tire molding release agent composition was inspected visually and tactilely before and after vulcanization. These results are in Table 2 along with a global evaluation of the tire molding release agent composition.

COMPARATIVE EXAMPLE 2

A tire molding release agent composition was prepared as in Example 2, but omitting the 50 mesh polyethylene glycol and increasing the addition of 100 mesh talc powder to 30 parts. The emulsion stability of the resulting tire molding release agent composition was evaluated after 7 days as in Example 2. The tire molding release agent composition was applied to a butyl rubber sheet as in Example 2, and sprayability during application, releasability of the coated sheet, and appearance and smoothness of the surface before and after vulcanization, were all evaluated as in Example 2. These results are in Table 2 along with a global evaluation of the tire molding release agent composition.

TABLE 2

|  | Example 2 | Comparative Example 2 |
|---|---|---|
| emulsion stability | stable, no separation | stable, no separation |
| sprayability | excellent | excellent |
| releasability of the coated sheet | the 2 sheets were easily peeled from each other | the 2 sheets were easily peeled from each other |
| surface of the coated sheet |  |  |
| pre-vulcanization | white, unevenness in the spray could easily be distinguished | white, unevenness in the spray could easily be distinguished |
| post-vulcanization | almost completely black with excellent smoothness | white with excellent smoothness |
| global evaluation of suitability as a release agent composition for tire molding service | very suitable | unsuitable |

EXAMPLE 3

Using a spray gun, the tire molding release agent composition in Example I was sprayed at the rate of 5 g/tire onto an unvulcanized radial tire with an outside diameter of 10 inches for light automobile service. Some unevenness in color density was produced because the U-shaped interior of the radial tire prevented a uniform, patch-free spray application. After drying, the unvulcanized radial tire was set in a Bag-O-Matic vulcanizer and vulcanized for 15 minutes at 170° C. After vulcanization, the molded tire exhibited excellent release from the bladder entirely without problems. The inner liner surface was almost completely black, with a uniformity to the point that the pre-vulcanization white patchiness was completely absent.

COMPARATIVE EXAMPLE 3

Using a spray gun, the tire molding release agent composition in Comparative Example 1 was sprayed at the rate of 5 g/tire onto an unvulcanized radial tire with an outside diameter of 10 inches for light automobile service. Some unevenness in color density was produced because the U-shaped interior of the radial tire prevented a uniform, patch-free spray application. After drying, the unvulcanized radial tire was set in a Bag-O-Matic vulcanizer and vulcanized for 15 minutes at 170° C. After vulcanization, the molded tire exhibited excellent release from the bladder entirely without problems. Although some attenuation of the whiteness on the inner liner surface had occurred, the patchiness present prior to vulcanization could still be seen.

Because the composition comprises components (A) to (E) and in particular because it contains component (D) when applied to the surface of the inner liner of the unvulcanized green tire, it has a white color prior to tire vulcanization and appears black to blackish-gray after vulcanization.

Other variations and modifications may be made in compounds, compositions, and methods described without departing from essential features of our invention. The forms of our invention are only exemplary and not limitations on its scope defined in the claims.

That which is claimed is:

1. A release agent for tire molding applications comprising 3–20 percent by weight of a diorganpolysiloxane having a viscosity of at least 100 centistokes; 0.5–20 percent by weight of an emulsifying agent selected from the group consisting of anionic surfactants, nonionic surfactants, natural lecithin, polyvinyl alcohol, methylcellulose, carboxymethylcellulose, and carboxyethylcellulose; 3–25 percent by weight of mica powder or talc powder; 3–33 percent by weight of a second powder having a melting point not exceeding 200 ° C., the second powder being selected from the group consisting of magnesium stearate, calcium stearate, zinc stearate, and aluminum stearate; and 2–90.5 percent by weight of water.

2. A release agent for tire molding applications comprising 3–20 percent by weight of a diorganpolysiloxane having a viscosity of at least 100 centistokes; 0.5–20 percent by weight of an emulsifying agent selected from the group consisting of anionic surfactants, nonionic surfactants, natural lecithin, polyvinyl alcohol, methylcellulose, carboxymethylcellulose, and carboxyethylcellulose; 3–25 percent by weight of mica powder or talc powder; 3–33 percent by weight of a second powder having a melting point not exceeding 200° C., the second powder being selected from the group consisting of magnesium stearate, calcium stearate, zinc stearate, and aluminum stearate; and 2–90.5 percent by weight of water; the release agent being in the form of an emulsion prepared by pre-emulsifying the diorganpolysiloxane, emulsifying agent, and water; and adding to the pre-emulsion, mica powder or talc powder, the second powder, and additional water.

3. A method of vulcanizing tires in a mold comprising applying to an unvulcanized tire a release agent, vulcanizing the tire in the mold, and removing the vulcanized tire from the mold, surfaces of the unvulcanized tire coated with the release agent prior to vulcanization have a white appearance but having a black appearance following vulcanization, the release agent comprising 3–20 percent by weight of a diorganpolysiloxane having a viscosity of at least 100 centistokes; 0.5–20 percent by weight of an emulsifying agent selected from the group consisting of anionic surfactants, nonionic surfactants, natural lecithin, polyvinyl alcohol, methylcellulose, carboxymethylcellulose, and carboxyethylcellulose; 3–25 percent by weight of mica powder or talc powder; 3–33 percent by weight of a second powder having a melting point not exceeding 200 ° C., the second powder being selected from the group consisting of magnesium stearate, calcium stearate, zinc stearate, and aluminum stearate; and 2–90.5 percent by weight of water; the release agent being in the form of an emulsion prepared by pre-emulsifying the diorganpolysiloxane, emulsifying agent, and water; and adding to the pre-emulsion, mica powder or talc powder, the second powder, and additional water.

* * * * *